(12) United States Patent
Chodacki

(10) Patent No.: US 11,553,690 B2
(45) Date of Patent: Jan. 17, 2023

(54) DROP TUBE AND A ROTARY PARLOUR FEEDING PROVIDED WITH SUCH A DROP TUBE

(71) Applicant: DELAVAL HOLDING AB, Tumba (SE)

(72) Inventor: Artur Chodacki, Tumba (SE)

(73) Assignee: DeLaval Holding AB, Tumba (SE)

( * ) Notice: Subject to any disclaimer, the term of this patent is extended or adjusted under 35 U.S.C. 154(b) by 360 days.

(21) Appl. No.: 16/620,324

(22) PCT Filed: Jun. 5, 2018

(86) PCT No.: PCT/SE2018/050581
§ 371 (c)(1),
(2) Date: Dec. 6, 2019

(87) PCT Pub. No.: WO2018/226145
PCT Pub. Date: Dec. 13, 2018

(65) Prior Publication Data
US 2020/0187453 A1 Jun. 18, 2020

(30) Foreign Application Priority Data
Jun. 7, 2017 (SE) .................................. 1750721-1

(51) Int. Cl.
*A01K 5/02* (2006.01)
(52) U.S. Cl.
CPC .................................. *A01K 5/0225* (2013.01)
(58) Field of Classification Search
CPC ........ A01K 5/02; A01K 5/025; A01K 5/0233; A01K 5/024; A01K 5/0241; A01K 5/0275;
(Continued)

(56) References Cited

U.S. PATENT DOCUMENTS 2,576,154 A * 11/1951 Trautvetter .............. A01K 5/01
119/72
4,770,124 A 9/1988 Dubbe
(Continued)

FOREIGN PATENT DOCUMENTS

CA 2460880 A1 * 10/2004 ........... A01K 1/0209
CN 102958351 A 3/2013
(Continued)

OTHER PUBLICATIONS

Office Action issued in Chinese Patent Application No. 201880026597.3 dated May 21, 2021.
(Continued)

*Primary Examiner* — Ebony E Evans
(74) *Attorney, Agent, or Firm* — Nixon & Vanderhye

(57) ABSTRACT

A drop tube for providing food to an animal in a milking stable, the drop tube configured to receive food from a food container arranged vertically above the drop tube and to deliver the received food into a food manger, the drop tube including a tubular connection section to connect to a food container, a tubular mid-section with a first end connected to the connection section, and a tubular end section connected to a second end of the tubular mid-section, the tubular end section having a centre axis and presenting an opening in a tubular wall portion of the tubular end section, and the tubular end section has an end wall which is intersected by the centre axis of the tubular end section.

11 Claims, 6 Drawing Sheets

(58) Field of Classification Search
CPC ...... A01K 5/0283; A01K 5/0291; A01K 7/00; A01K 7/025
See application file for complete search history.

(56) References Cited

U.S. PATENT DOCUMENTS

| | | | | |
|---|---|---|---|---|
| D336,554 S | * | 6/1993 | Reeder | D30/121 |
| 5,233,941 A | * | 8/1993 | Ayliffe, Jr. | A01K 5/0225 |
| | | | | 119/57.91 |
| 5,533,646 A | * | 7/1996 | Dildine | A63B 47/002 |
| | | | | 221/185 |
| 5,555,843 A | * | 9/1996 | Harmon | A01K 5/0241 |
| | | | | 119/57.91 |
| D457,399 S | * | 5/2002 | Jaggernauth | D8/1 |
| D476,451 S | * | 6/2003 | Morgan, Sr. | 119/52.1 |
| 6,959,664 B1 | | 11/2005 | Keuter et al. | |
| D559,470 S | * | 1/2008 | Stevens | D30/121 |
| 8,424,488 B2 | | 4/2013 | Jonsson et al. | |
| D787,751 S | * | 5/2017 | Bosco | D30/121 |
| 9,675,041 B2 | | 6/2017 | Eriksson et al. | |
| 2013/0098295 A1 | | 4/2013 | Mulder | |
| 2020/0146259 A1 | * | 5/2020 | Klocke | A01K 5/0241 |

FOREIGN PATENT DOCUMENTS

| | | | | |
|---|---|---|---|---|
| CN | 104822259 A | | 8/2015 | |
| FR | 2859876 A1 | * | 3/2005 | ........... A01K 5/0275 |
| FR | 2859876 A1 | | 3/2005 | |
| GB | 1175588 A | | 12/1969 | |
| GB | 1459399 A | * | 12/1976 | ............. A01K 1/126 |
| KR | 20160004352 U | * | 12/2016 | |
| WO | 03/086057 A1 | | 10/2003 | |
| WO | 2008/048180 A1 | | 4/2008 | |
| WO | WO-2013137804 A2 | * | 9/2013 | ........... A01K 1/126 |
| WO | 2014/055005 A1 | | 4/2014 | |
| WO | WO-2014204395 A1 | * | 12/2014 | ........... A01J 5/0175 |

OTHER PUBLICATIONS

International Search Report and Written Opinion, dated Oct. 5, 2018, from corresponding PCT application No. PCT/SE2018/050581.

SE Search Report, dated Jan. 30, 2018, from corresponding SE application No. 1750721-1.

* cited by examiner

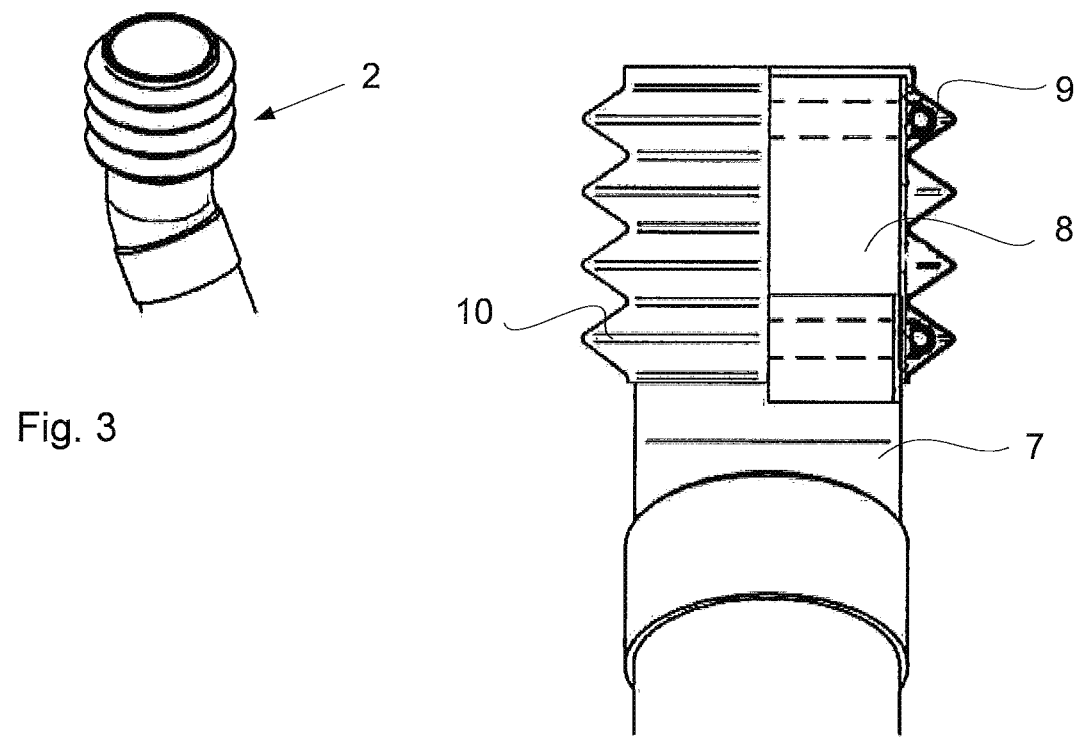
Fig. 3
Fig. 4
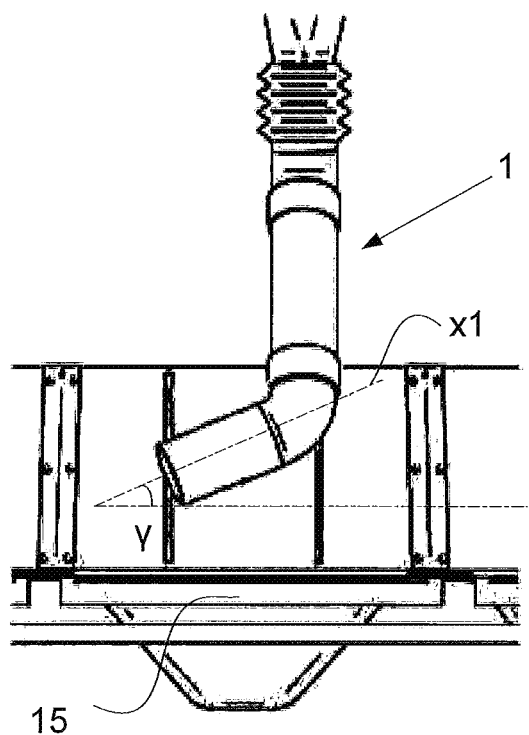
Fig. 5

DROP TUBE AND A ROTARY PARLOUR FEEDING PROVIDED WITH SUCH A DROP TUBE

TECHNICAL FIELD

The present invention relates to a drop tube arranged to provide food to an animal in a milking stable, said drop tube being configured to receive food from a food container arranged vertically above the drop tube and to deliver the received food into a food manger, said drop tube comprising a tubular connection section configured to be connected to a food container, a tubular mid-section, which in a first end is connected to the connection section, and a tubular end section, which is connected to a second end of the tubular mid-section.

The present invention also relates to a rotary parlour provided with a feeding device comprising such a drop tube.

BACKGROUND ART

In milking stables for the milking of cows, in particular so called rotary parlours, there may be provided a food manger and a feeding device for providing food to the food manger. The feeding device usually comprises a container from which a drop tube extends towards the food manger. At the end of the drop tube there is an opening through which the food and nutrients from the container is dropped into or onto the food manger.

When food or nutrients is dropped into or onto the food manger, some of the food and nutrients tends to bounce off and out of the food manger due to the speed of the food and nutrients falling down into the food manger. This causes loss of food and nutrients for the animal as well as economical loss for the farmer.

It is therefore an object of the invention to provide a feeding device, and more precisely a drop tube, that reduces the losses of food due to off-bouncing, as compared to prior art.

SUMMARY OF THE INVENTION

The object of the invention is achieved by means of the initially defined drop tube, characterised in that the tubular end section has a centre axis, that the tubular end section presents an opening in a tubular wall portion of the tubular end section, and that the tubular end section has an end wall which is intersected by the centre axis of the tubular end section. This means that food and nutrients that travels through the drop tube and is supposed to be poured out through the drop tube is forced to a radical change of flow direction due to the provision of the end wall and the positioning of said opening in a tubular wall portion of the end section of the drop tube. This change of flow direction will also result in a speed reduction of the food and nutrients that will eventually prevent off-bouncing of some of the food and nutrients from a food manger into which the food and nutrients is poured from the drop tube. In a wide sense of the invention, the end wall may have any shape, but is presently preferred that it is generally flat, preferably with a uniform thickness. The different tubular sections mentioned may be provided as separate parts connected to each other by means of joints such as tube fittings, or may be integrated into one single body.

According to one embodiment, said opening extends from the end wall towards the tubular mid-section. Thereby, there will be no pocket inside the drop tube in the region of the end wall where food and nutrients would run the risk of being trapped.

According to one embodiment, said opening has an area A and the tubular end section defines a channel which has a cross-sectional area B, wherein 0.50<A<2×B. If the opening is too small, the flow rate will be insufficient, and if it is too big there will still be off-bouncing problems due to high speed flowing of food and nutrients out of the drop tube. Preferably, A>B, and even more preferably A>1.5B. Thereby, a speed reduction of the food leaving the drop tube may be achieved while the amount of food delivered per time unit is not correspondingly reduced.

According to one embodiment, the centre axis of the tubular end section has an angle α of 25°-90° in relation to the end wall. If the angle α is less than 90° it means that the end section presents an off-tapering tip. In such a case, the opening in the tubular wall portion extends from the tip. A larger angle α will result in a more dramatic change of flow direction and thus a more accentuated speed reduction.

According to one embodiment, the centre axis of the tubular end section defines a normal in relation to the end wall.

According to an alternative embodiment, the end wall extends in a plane that has an angle α of 25°-65° relative to the centre axis of the tubular end section.

According to one embodiment, the tubular mid-section has a centre axis, and the centre axis of the tubular end section extends with an angle β in relation to the centre axis of the tubular mid-section. This design promotes positioning of the tubular end section with the opening thereof turned downwards towards a food manger. It also means that the drop tube subjects food or nutrients flowing through the drop tube for yet another change of direction apart from the one caused by the above-mentioned end wall, which contributes to further speed reduction. According to one embodiment, said angle β is at least 100°. According to an alternative embodiment, said angle β is in the range of 120°-145°.

According to one embodiment, the tubular connection section is more flexible than the tubular mid-section and the tubular end section. The tubular connection section is flexible enough to allow an angular set off of 10°, preferably 20° of the drop tube from a positioned in which it is fixed to and extending from a food container, without any remaining plastic deformation of the tubular connection section. Thereby, certain disposition of the drop tube, for example caused by an animal getting in touch with the tubular end section of the drop tube, is permitted without permanent deformation of the drop tube. It is regarded as positive to let the mid-section and the end section of the drop tube to be relatively rigid, while the elastic deformation is adopted by the tubular connection section.

The invention also relates to a rotary parlour comprising an animal feeding device comprising a food container which has a bottom wall in which there is provided an opening and a tubular outlet, said animal feeding device being characterised in that it comprises a drop tube according to the invention and that the tubular connection section of the drop tube is connected to the tubular outlet of the food container.

According to one embodiment, the rotary parlour comprises a food manger and the drop tube extends into the food manger. "Into the food manger" is referred to as into the area of the food manger such that food falling from the opening of the drop tube will fall into or onto the food manger. The food manger has a bottom surface and may have one or more walls that partly or fully encircles said bottom surface. In one particular embodiment, the food manger has no side wall in a direction towards the part of the milking stable where an animal is assumed to be standing during milking and while eating from the food manger.

According to one embodiment, the centre axis of the tubular end section has an angle γ in the range of 20°-75° in relation to the horizontal plane. If the angle is too small, there is a risk of having remaining food in the drop tube upstream said opening in the tubular end section after ending of a food delivery sequence, due to insufficient flow of food. A food delivery sequence is controlled by a food delivery device, such as an auger, which controls the flow of food from the container into the drop tube. If the angle is too large, there is a risk of having remaining food inside the drop tube in the region of the end wall of the tubular end section.

According to one embodiment, the rotary parlour comprises a rotating part on which there is provided a plurality a of food mangers side by side in a circular arrangement around a rotating axis of said rotating part, and the centre axis of the end section extends in a tangential direction relative the rotation direction of the rotating part.

BRIEF DESCRIPTION OF THE DRAWINGS

Embodiments of the invention will now be described more in detail with regard to the annexed drawing, on which:

FIG. 3 is perspective view of a tubular connection section of a drop tube according to the present invention, FIG. 4 is a partial cross section of the tubular connection section shown in FIG. 3, FIG. 5 is a side view of the drop tube shown in FIGS. 1 and 2 arranged for delivery of food into food manger.

DETAILED DESCRIPTION

Figure 1:
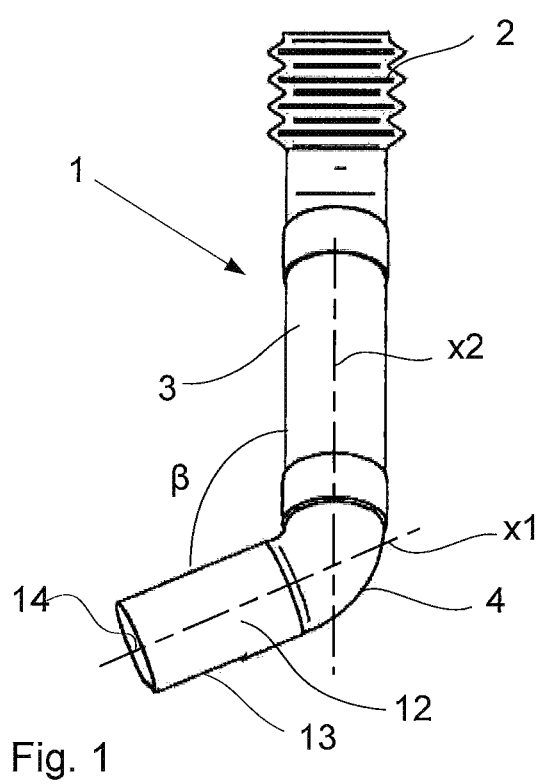
FIG. 1 is a perspective view of a first embodiment of a drop tube according to the present invention.

FIG. 1 shows a first embodiment of a drop tube 1 according to the invention. The drop tube 1 comprises a tubular connection section 2 configured to be connected to a food container (indicated with 5 in FIG. 2), a tubular mid-section 3, which in a first end is connected to the connection section 2, and a tubular end section 4, which is connected to a second end of the tubular mid-section 3.

Figure 2:
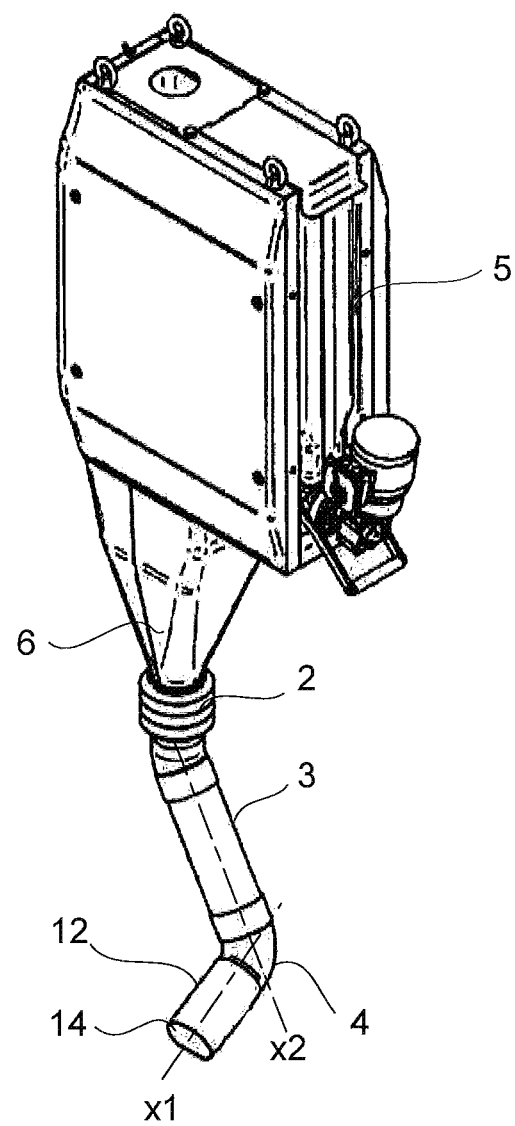
FIG. 2 is a perspective view of an animal feeding device comprising the drop tube shown in FIG. 1.

FIG. 2 shows an animal feeding device comprising a food container 5 and the drop tube 1 shown in FIG. 1. The food container 5 comprises a food outlet tube 6 to which the tubular connection section 2 of the drop tube 1 is connected.

The tubular connection section 2 is shown in detail in FIGS. 3 and 4, and comprises a tube 7 made of a polymer suitable for the purpose, preferably PVC, which is connected to the tubular mid-section 3 by a tube fitting joint. At an opposite end of the tubular connection section 2, and connected to the PVC-tube, the connection section 2 comprises an elastic tubular pipe 8 made of polymer, preferably polyurethane, which is configured to be connected to the outlet tube 6 of the food container 5 by means of any suitable connection means, exemplified by a metal clamp 9 shown in FIG. 4. A rubber cover 10 is arranged such that it covers the tubular pipe 8 and parts of the PVC-tube 7.

The tubular mid-section 3 is made of a polymer, preferably PVC. It constitutes the major part, and the longest tubular part of the drop tube 1.

Figure 13:
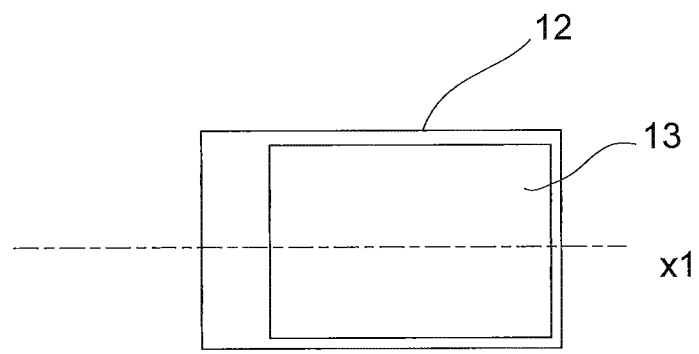
FIG. 13 shows the end piece shown in FIG. 11 from below.
Figure 14:
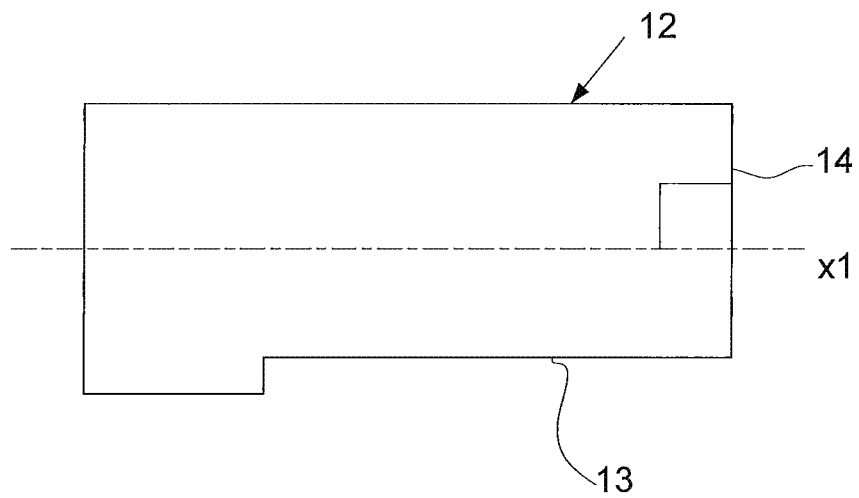
FIG. 14 is a side view of the end piece shown in FIG. 11.
Figure 15:
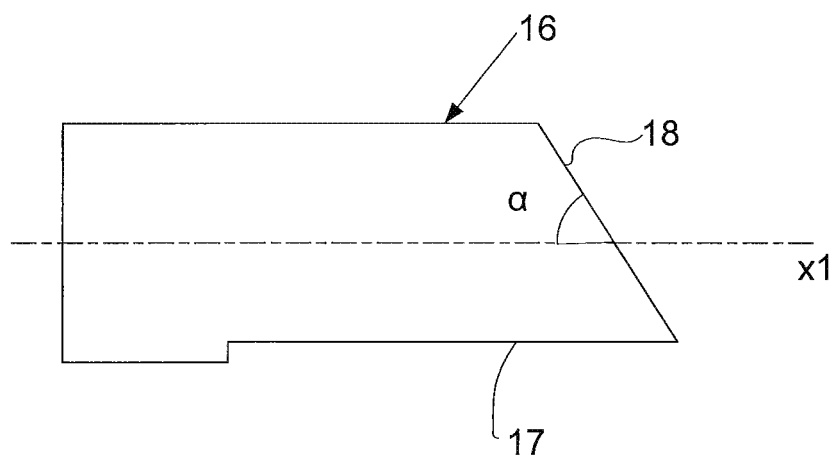
FIG. 15 is a side view of the end piece shown in FIG. 12.

The tubular end section 4 comprises a tube made of a polymer, preferably PVC, and an end piece 12 made of metal, preferably stainless steel, which is connected to the tube by a tube fitting joint. The tubular end section 4 has a centre axis x1, and the tubular end section 4 presents an opening 13 in a tubular wall portion of the tubular end section 4. The tubular end section 4 has an end wall 14 which is intersected by the centre axis x1 of the tubular end section 4. The end piece 12 comprises the opening 13 and the end wall 14. The opening 13 extends from the end wall 14 along the tubular wall of the tubular end section 4. It has a rectangular shape and its longer sides are parallel to the centre axis x1 of the tubular end section 4. The opening 13 has an area A and the flow channel inside the tubular end section has an area B, wherein A=1.5B in this specific embodiment. The centre axis x1 defines a normal to the end wall 14. The end wall 14 is generally flat and extends in a plane which is perpendicular to the tubular wall of the tubular end section 4 (see also FIG. 14). However, it should be understood that other end piece and end wall designs may be applied. The end piece design described hereinabove can be seen in FIGS. 11, 13 and 14. An alternative end piece design is shown in FIGS. 12 and 15, in which the end piece 16 has an end wall 18 that has an inclination angle α, such that a tip is formed on the end piece 16. In the embodiment shown in FIG. 15 the resulting angle α between the centre axis x1 and the end wall 18 of the end piece 16 is approximately 70°. The opening 17 in the end piece 16 extends from the tip.

In the embodiment shown in FIGS. 1 and 2 the tubular end section 4 is provided with a bent part, here formed by the previously mentioned tube of the tubular end section, which is connected to the tubular mid-section 3. As a result thereof, the tubular mid-section 3 has a centre axis x2, and the centre axis x1 of the tubular end section 4 extends with an angle β in relation to the centre axis x2 of the tubular mid-section 3. In the embodiment shown, the angle β is approximately 120°. By the provision of said angle β, the tubular mid-section 3 may be allowed to extend generally vertically towards a food manger, while the opening 13 provided on the tubular end section 4 can be directed generally downwards. In the embodiment shown in FIGS. 1 and 2 there is also an angle between a centre axis of the tubular connection section 2 and the centre axis of the tubular mid-section 3, so that, in this case, the tubular mid-section will not extend vertically from the container 5 but with an angle in relation to the vertical direction.

Figure 6:
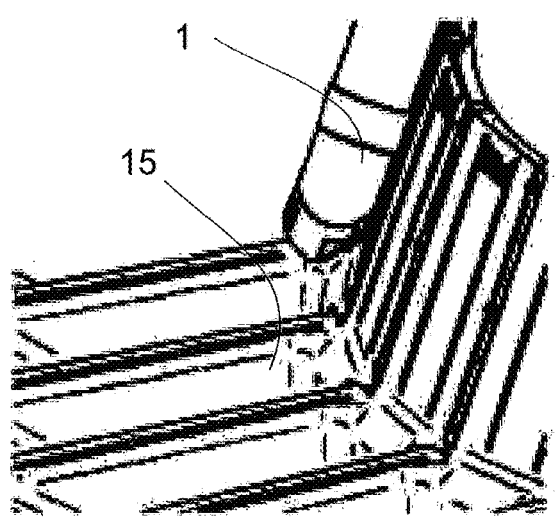
FIG. 6 is the drop tube and food manger of FIG. 5 as seen from another angle.

FIGS. 5 and 6 show an example of how the drop tube 1 shown in FIGS. 1 and 2 can be arranged with regard to a food manger 15 of a rotary parlour arrangement. The opening 13 of the drop tube 1 is directed towards the food manger 15 and the centre axis x1 of the tubular end section 4 extends with an angle γ of approximately 30° to the horizontal plane. Food travelling from the container 5 through the drop tube 1 will hit the end wall 14 of the drop tube 1 and fall out through the opening 13 into the manger with a reduced speed due to the impact of the end wall 14.

Figure 7:
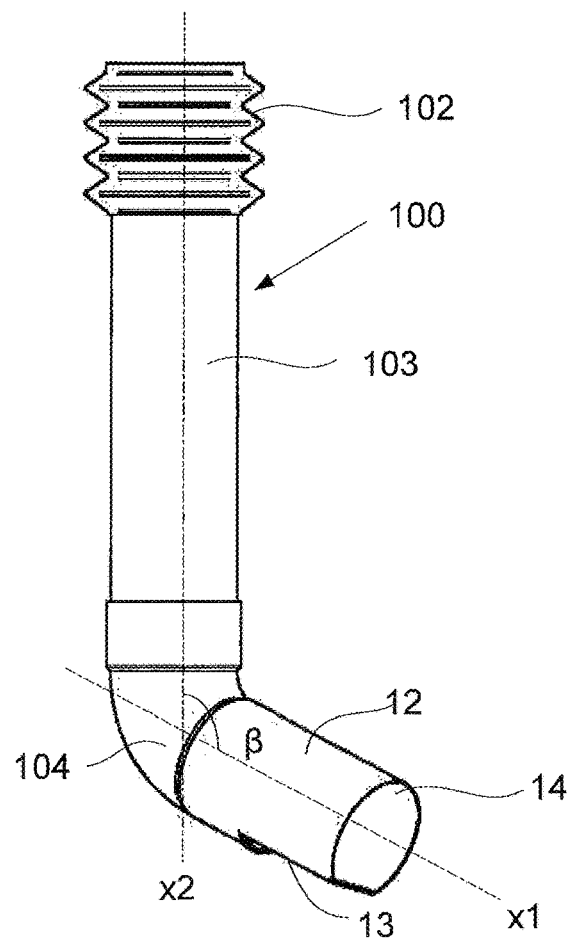
FIG. 7 is a perspective view of a second embodiment of a drop tube according to the present invention.

FIG. 7 shows an alternative embodiment of the drop tube 100 which differs from the embodiment shown in FIGS. 1 and 2 in that the tubular connection section 102 is integrated with the tubular mid-section 103 and formed by the same tube as the latter. There is no angle between the tubular connection section 102 and the tubular mid-section 103. As in the embodiment shown in FIGS. 1 and 2, the tubular end section 104 is provided with a bent part which is connected to the tubular mid-section 103. The centre axis x1 of the tubular end section 104 extends with an angle β in relation to the centre axis x2 of the tubular mid-section 103. In the embodiment shown, the angle β is approximately 120°. The tubular end section 104 is provided with an end piece 12 corresponding to the end piece 12 described hereinabove.

Figure 8:
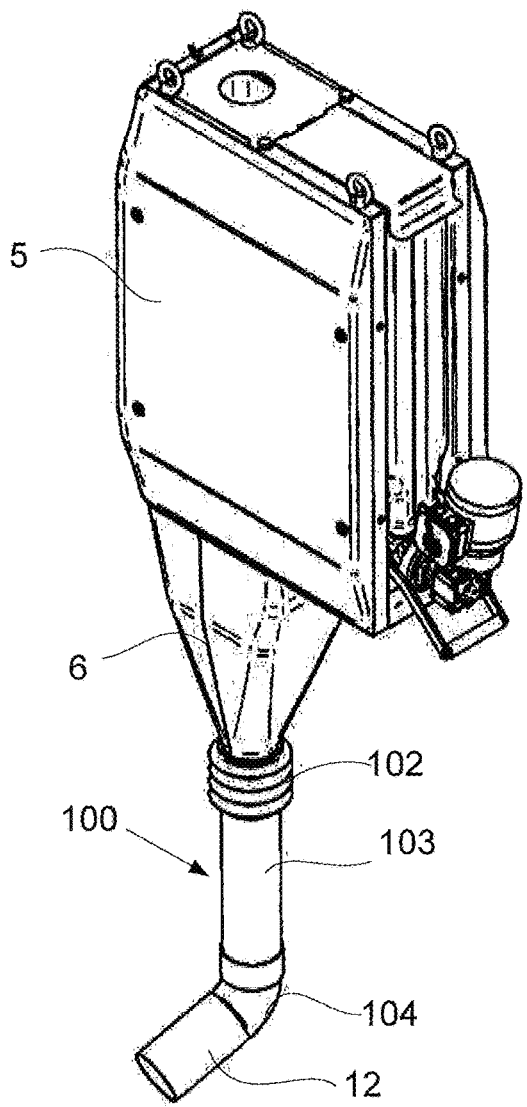
FIG. 8 is a perspective view of an animal feeding device comprising the drop tube shown in FIG. 7.

FIG. 8 shows the drop tube 100 mounted to a food container 5 from which food is fed into the drop tube 100. The feeding unit comprised by the container 5 and the drop tube 100 may be arranged in a rotary parlour for the purpose of dropping food into a food manger in the same way as disclosed with reference to FIGS. 5 and 6.

Figure 9:
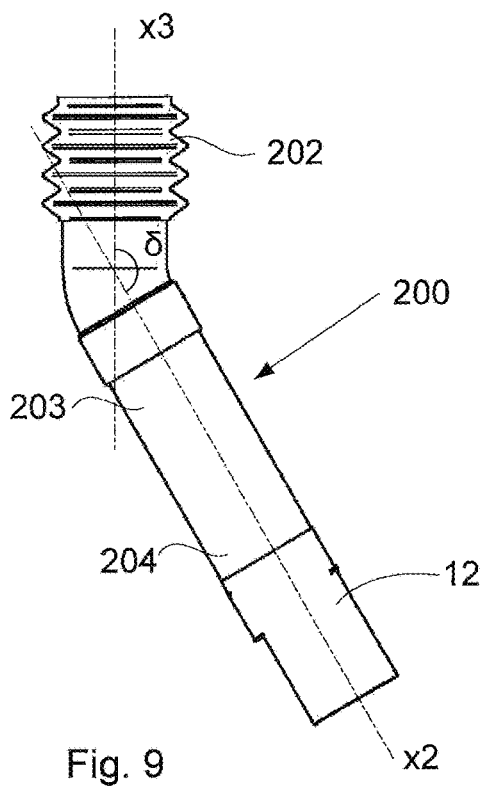
FIG. 9 is a perspective view of a third embodiment of a drop tube according to the present invention.
Figure 10:
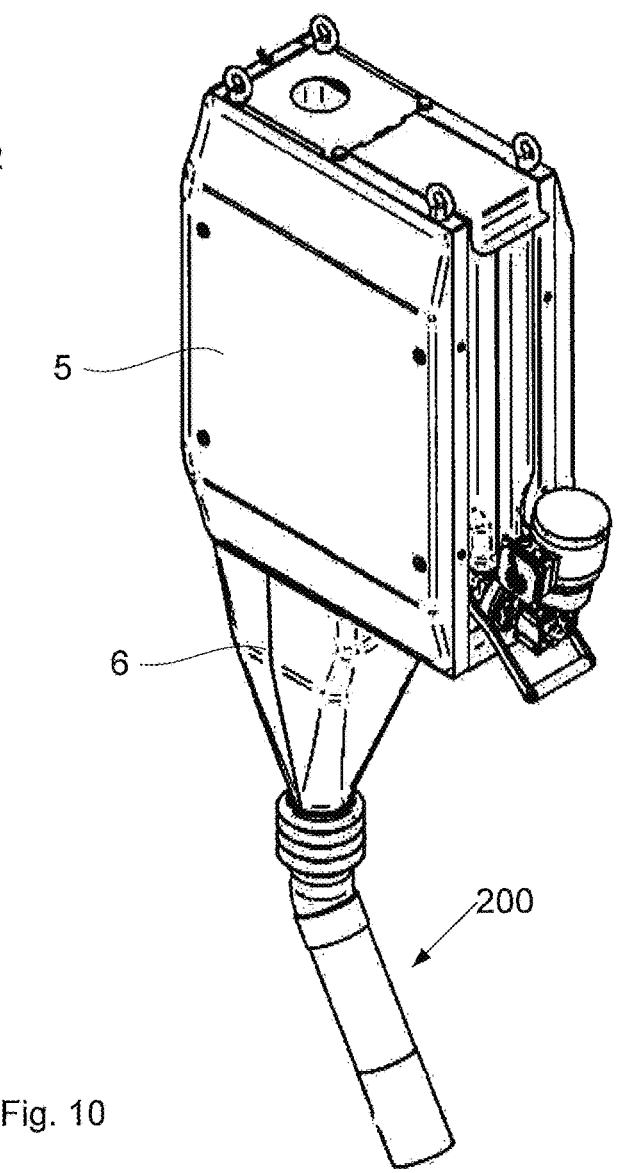
FIG. 10 is a perspective view of an animal feeding device comprising the drop tube shown in FIG. 9.

FIG. 9 shows yet another embodiment of a drop tube 200 according to the present invention, in which the tubular end section 204 is integrated with the tubular mid-section 203 and formed by the same tube as the latter. Accordingly there is no angle between the centre axis of the tubular end section 204 and the centre axis of the tubular mid-section 203. However, likewise to the embodiment shown in FIGS. 1 and 2, there is an angle δ between a centre axis x3 of the tubular connection section 202 and the centre axis x2 of the tubular mid-section 203, so that, in this case, the tubular mid-section 203 will not extend vertically from the container 5 but with an angle in relation to the vertical direction. The drop tube 200 is provided with an end piece 12 corresponding to the end piece 12 described hereinabove.

Figure 11:
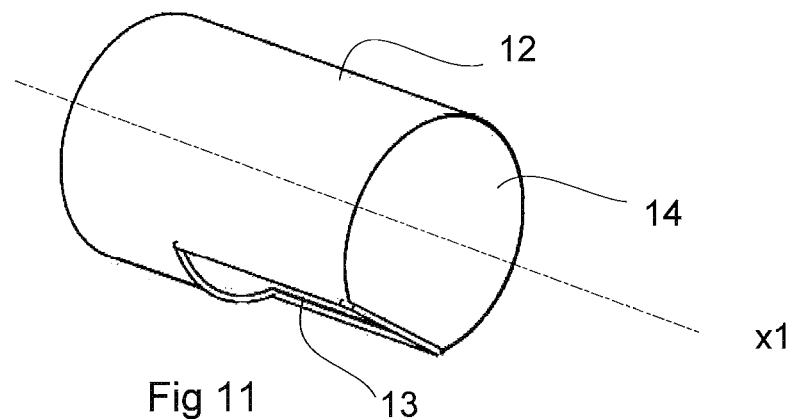
FIG. 11 shows a first embodiment of an end piece of the drop tube.
Figure 12:
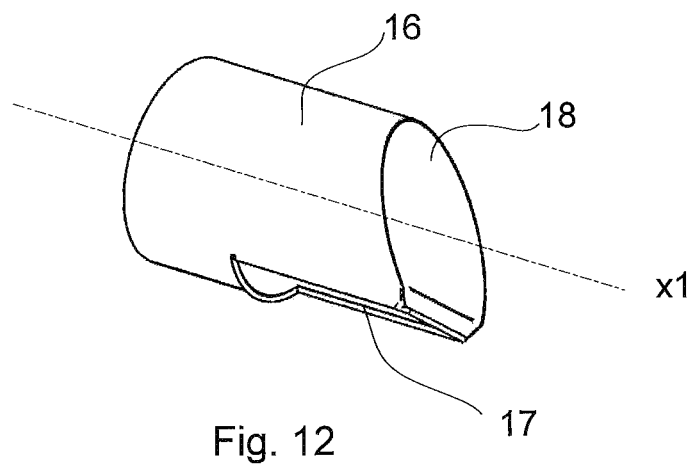
FIG. 12 shows a second embodiment of an end piece of the tube.

The drop tubes 1, 100, 200 of the embodiments described hereinabove have been shown with an and piece 12 as shown in FIG. 11. However, the drop tubes 1, 100, 200 may alternatively be equipped with an end piece having an end wall 18 which extends in a plane that has an angle α in the range of 25°-90°, preferably 25°-65° relative to the centre axis x1 of the tubular end section 4, 104, 204. An embodiment of such an end piece 16 is shown in FIG. 12. The opening 17 of such an end piece 16 extends from a tip of the end piece 16 and preferably has a design and an area relative the cross sectional area of the tubular end section 4, 104, 204 corresponding to that of the end piece 12 shown in FIG. 11.

It should be understood that the scope of protection sought for does not necessarily require the presence of a specific and separate end piece and the subdivision of the drop tube in separate parts that form the separate sections that now have been described. As has been shown, different tubular section may be integrated in one and the same element if that is found suitable, and the end piece may be integrated with the rest of the tubular end section or may be a separate part.

The invention claimed is:

1. A rotary parlour, comprising:
   an animal feeding device, equipped with a food container, having a bottom wall in which there is provided an opening and a tubular outlet, and a drop tube for passage of food to an animal in the rotary parlour, said drop tube configured to receive food from the food container arranged vertically above the drop tube, and said drop tube being configured to deliver the received food into a food manger of the rotary parlour,
   said drop tube comprising:
      a tubular connection section, which is connected to the tubular outlet of the food container;
      a tubular mid-section, a first end thereof connected to the connection section; and
      a tubular end section connected to a second end of the tubular mid-section,
   wherein the drop tube extends into the food manger of the rotary parlour,
   wherein a centre axis (x1) of the tubular end section (4, 104) is angled with respect to a centre axis (x2) of the tubular mid-section (3, 103),
   wherein the tubular end section has a single opening, facing downward, the single opening formed in a tubular wall portion of the tubular end section at a bottom of the tubular wall portion, and
   wherein the tubular end section has an end wall at a terminal end of the tubular end section that intersects the centre axis (x1) of the tubular end section.

2. The rotary parlour according to claim 1, wherein said opening in the tubular wall portion of the tubular end section extends from the end wall towards the tubular mid-section.

3. The rotary parlour according to claim 1, wherein said opening in the tubular wall portion has an area A, and the tubular end section defines a channel which has a cross-sectional area B, such that $0.5 \times B < A < 2 \times B$.

4. The rotary parlour according to claim 1, wherein the centre axis (x1) of the tubular end section has an angle α of 25°-90° in relation to the end wall.

5. The rotary parlour according to claim 1, wherein the end wall presents a plane that is perpendicular to the centre axis (x1) of the tubular end section.

6. The rotary parlour according to claim 1, wherein the end wall extends in a plane that has an angle α of 25°-65° relative to the centre axis (x1) of the tubular end section.

7. The rotary parlour according to claim 1, wherein the tubular mid-section has a mid-section centre axis (x2), and the centre axis (x1) of the tubular end section extends at an angle β of at least 100° in relation to the mid-section centre axis (x2) of the tubular mid-section.

8. The rotary parlour according to claim 7, wherein said angle β is in a range of 120°-145°.

9. The rotary parlour according to claim 1, wherein the tubular connection section is more flexible than the tubular mid-section and the tubular end section.

10. The rotary parlour according to claim 1, wherein the centre axis of the tubular end section extends along a direction that is angled in relation to the horizontal plane by an angle γ in a range of 20°-75°.

11. The rotary parlour according to claim 1, further comprising:
   a rotating part on which there is provided a plurality of food mangers side by side in a circular arrangement around a rotating axis of said rotating part,
   wherein the centre axis of the tubular end section of the drop tube extends in a tangential direction relative a direction of rotation of the rotating part.

* * * * *